US012484770B2

(12) United States Patent
Bloembergen et al.

(10) Patent No.: US 12,484,770 B2
(45) Date of Patent: Dec. 2, 2025

(54) DENTAL IMAGING AND/OR CURING SYSTEM

(71) Applicant: GreenMark Biomedical Inc., East Lansing, MI (US)

(72) Inventors: Steven Bloembergen, Okemos, MI (US); Scott Raymond Pundsack, Georgetown (CA)

(73) Assignee: GREENMARK BIOMEDICAL INC., East Lansing, MI (US)

( * ) Notice: Subject to any disclaimer, the term of this patent is extended or adjusted under 35 U.S.C. 154(b) by 1028 days.

(21) Appl. No.: 17/273,184

(22) PCT Filed: Sep. 5, 2019

(86) PCT No.: PCT/US2019/049778
§ 371 (c)(1),
(2) Date: Mar. 3, 2021

(87) PCT Pub. No.: WO2020/051352
PCT Pub. Date: Mar. 12, 2020

(65) Prior Publication Data
US 2021/0321864 A1     Oct. 21, 2021

Related U.S. Application Data

(60) Provisional application No. 62/727,717, filed on Sep. 6, 2018.

(51) Int. Cl.
*A61B 1/04* (2006.01)
*A61B 1/00* (2006.01)
(Continued)

(52) U.S. Cl.
CPC .......... *A61B 1/043* (2013.01); *A61B 1/00186* (2013.01); *A61B 1/05* (2013.01);
(Continued)

(58) Field of Classification Search
None
See application file for complete search history.

(56) References Cited

U.S. PATENT DOCUMENTS 4,479,499 A * 10/1984 Alfano ................ A61B 5/0088
356/417
6,084,005 A    7/2000 Fukunishi et al.
(Continued)

FOREIGN PATENT DOCUMENTS

EP    2061372 A1    5/2009
EP    2895106 A1    7/2015
(Continued)

OTHER PUBLICATIONS

European Patent Application No. 19857357.8, Partial Supplementary European Search Report dated May 16, 2022.
(Continued)

*Primary Examiner* — John P Leubecker

(57) ABSTRACT

This specification describes a dental imaging and/or curing system and methods of using it, optionally in combination with a fluorescent imaging aid applied to a tooth. In some examples, a system or kit described in this specification combines a fluorescent compound with an intra-oral device. The intra-oral device includes a light source to excite the fluorescent compound. The intra-oral device further includes a sensor to produce an image of fluorescent light emitted from the fluorescent compound. Optionally, the fluorescent compound can include positively charged nanoparticles including a fluorophore, for example fluorescein. Optionally, the intra-oral device can include a blue LED, a bandpass emission filter and a digital camera sensor. This specification also describes an intra-oral device and a method of producing an image of plaque, calculus or active carious lesions in the mouth of a person or other animal.

9 Claims, 4 Drawing Sheets

(51) Int. Cl.
*A61B 1/05* (2006.01)
*A61B 1/06* (2006.01)
*A61B 1/24* (2006.01)
*G06T 7/00* (2017.01)

(52) U.S. Cl.
CPC .......... *A61B 1/0638* (2013.01); *A61B 1/0646* (2013.01); *A61B 1/0684* (2013.01); *A61B 1/24* (2013.01); *G06T 7/0012* (2013.01); *G06T 2207/10068* (2013.01); *G06T 2207/30036* (2013.01)

(56) References Cited

U.S. PATENT DOCUMENTS

| | | | |
|---|---|---|---|
| 6,276,934 B1* | 8/2001 | Rakocz | A61B 1/247 433/29 |
| 7,365,844 B2 | 4/2008 | Richards-Kortum et al. | |
| 8,571,397 B2 | 10/2013 | Liu et al. | |
| 8,982,200 B2* | 3/2015 | Kitaoka | A61B 1/247 348/66 |
| 9,547,903 B2 | 1/2017 | Wu et al. | |
| 10,215,977 B1 | 2/2019 | Feinbloom et al. | |
| 10,987,434 B2 | 4/2021 | Lahann et al. | |
| 11,150,537 B2* | 10/2021 | Pikkula | G03B 15/02 |
| 2004/0202356 A1* | 10/2004 | Stookey | A61B 5/0088 382/128 |
| 2004/0240716 A1* | 12/2004 | de Josselin de Jong | G06T 7/0012 382/128 |
| 2005/0003323 A1* | 1/2005 | Katsuda | A61B 1/00096 433/29 |
| 2008/0038686 A1 | 2/2008 | Nagai | |
| 2008/0063998 A1 | 3/2008 | Liang et al. | |
| 2008/0094631 A1 | 4/2008 | Jung et al. | |
| 2010/0145669 A1 | 6/2010 | Norden et al. | |
| 2011/0157457 A1* | 6/2011 | Mo | H04N 23/676 348/E5.045 |
| 2011/0275900 A1 | 11/2011 | Gilhuly et al. | |
| 2013/0184591 A1 | 7/2013 | Tesar | |
| 2013/0189641 A1 | 7/2013 | Perfect et al. | |
| 2013/0323674 A1* | 12/2013 | Hakomori | A61B 1/043 433/29 |
| 2014/0017625 A1* | 1/2014 | Liu | A61B 1/042 433/29 |
| 2014/0120499 A1* | 5/2014 | Nakatsuka | A61K 6/30 252/301.4 R |
| 2015/0107034 A1 | 4/2015 | Shani et al. | |
| 2015/0250572 A1* | 9/2015 | Gramann | A61C 19/004 433/29 |
| 2015/0374634 A1 | 12/2015 | Koo et al. | |
| 2016/0330365 A1 | 11/2016 | Maruyama et al. | |
| 2017/0112949 A1 | 4/2017 | Lahann et al. | |
| 2017/0168812 A1 | 6/2017 | Golay et al. | |
| 2018/0206957 A1* | 7/2018 | Ruth | A61C 7/023 |
| 2018/0242848 A1 | 8/2018 | Dacosta et al. | |
| 2018/0249913 A1 | 9/2018 | Seibel et al. | |
| 2019/0313963 A1 | 10/2019 | Hillen | |
| 2019/0365236 A1 | 12/2019 | Van Der Poel et al. | |
| 2020/0008914 A1* | 1/2020 | Schmid | A61B 1/0684 |
| 2020/0030070 A1 | 1/2020 | Gerlach et al. | |
| 2020/0175681 A1 | 6/2020 | Ezhov et al. | |
| 2021/0302314 A1* | 9/2021 | Kawada | A61B 1/00 |

FOREIGN PATENT DOCUMENTS

| | | |
|---|---|---|
| WO | 2017070578 A1 | 4/2017 |
| WO | 2017205294 A1 | 11/2017 |
| WO | 2018101977 A1 | 6/2018 |
| WO | 2020051352 A1 | 3/2020 |

OTHER PUBLICATIONS

International Application No. PCT/US2022/018953, International Search Report and Written Opinion dated May 3, 2022.
Carestream Health Inc., Intraoral Cameras from Carestream Dental Brochure, 8 pages, 2012.
Carestream Health Inc., Carestream Dental CS 1600 Brochure, 8 pages, 2011.
International Application No. PCT/US2019/049778, International Preliminary Report on Patentability dated Mar. 18, 2021.
International Application No. PCT/US2019/049778, International Search Report and Written Opinion dated Dec. 23, 2019.
European Patent Application No. 19857357.8, Office Action dated Dec. 1, 2023.
European Patent Application No. 22764155.2, Extended European Search Report dated Dec. 6, 2024.
International Application No. PCT/US2022/018953, International Preliminary Report on Patentability dated Aug. 29, 2023.
University of Rochester, "Nanoparticles release drugs to reduce tooth decay", PhysOrg, Apr. 1, 2015 (obtained from: https://phys.org/news/2015-04-nanoparticles-drugs-tooth.html#google_vignette), 3 pages.
Horev et al., "pH-activated nanoparticles for controlled topical delivery of farnesol to disrupt oral biofilm virulence", ACS Nano, 2015, 9(3), 2390-2404.
Fusayama, "Two layers of carious dentin: diagnosis and treatment", Oper. Dent., 1979; 4, 63-70.
Kuboki et al., "Mechanism of differential staining in carious dentin", J. Dent. Res., 1983; 62, 713-714.

\* cited by examiner

DENTAL IMAGING AND/OR CURING SYSTEM

RELATED APPLICATIONS

This application is a National Stage Entry of International Application No. PCT/US2019/049778, filed Sep. 5, 2019, which claims priority from, and the benefit of, U.S. provisional patent application No. 62/727,717 filed on Sep. 6, 2018, which is incorporated herein by reference.

FIELD

This specification relates to dental imaging and/or curing systems.

BACKGROUND

Dental curing lights are typically used to polymerize resin based composites. The composites are used, for example, to fill or bond teeth. Dental curing lights may be, for example, tungsten halogen, light-emitting diode, plasma arc curing or laser type. The light emitted is typically in the blue light spectrum.

International Publication Number WO 2017/070578 A1, Detection and Treatment of Caries and Microcavities with Nanoparticles, published on Apr. 27, 2017, describes nanoparticles for detecting active carious lesions in teeth. In some examples the nanoparticles include starch that has been cationized and bonded to a fluorophore, for example fluorescein isomer 1 modified to have an amine functionality. The nanoparticles are positively charged and fluorescent. The nanoparticles can be applied to the oral cavity of a person and selectively attach to active caries lesions. The nanoparticles are excited by a dental curing lamp and viewed through UV-filtering glasses. Digital images were also taken with a digital camera. In some cases, the green channel was extracted for producing an image. Other images were made in a fluorescence scanner with a green 542 nm bandpass filter and blue light illumination.

INTRODUCTION

This specification describes a dental imaging and/or curing system and methods of using it, optionally in combination with a fluorescent imaging aid applied to a tooth.

In some examples, a system or kit described in this specification combines a fluorescent compound with an intra-oral device. The intra-oral device includes a light source to excite the fluorescent compound. The intra-oral device further includes a sensor to produce an image of fluorescent light emitted from the fluorescent compound. Optionally, the fluorescent compound can include positively charged nanoparticles including a fluorophore. The sensor can be coupled with a barrier filter, optionally a bandpass filter, wherein the barrier filter transmits light in the emission spectrum of the fluorophore. The light source can be a light-emitting diode (LED). The LED may be a colored LED with a peak output in the excitation spectrum of the fluorophore. The LED is optionally coupled with an excitation filter, which may be a bandpass filter.

This specification also describes an intra-oral device. In some examples, the intra-oral device can include a blue LED, optionally with a peak emission in the range of 480-500 nm. Optionally, the LED can be coupled with a bandpass excitation filter. The intra-oral device includes a multiple channel digital camera sensor. The sensor may be coupled with a bandpass barrier filter. The intra-oral device may be used in a kit or system as described above wherein the fluorescent compound comprises a fluorescein compound.

This specification also describes a method of producing an image of plaque, calculus or active carious lesions in the mouth of a person or other animal, a method of guiding an intra oral device, and a method of manipulating or using an image of a tooth.

DETAILED DESCRIPTION

Figure 1:
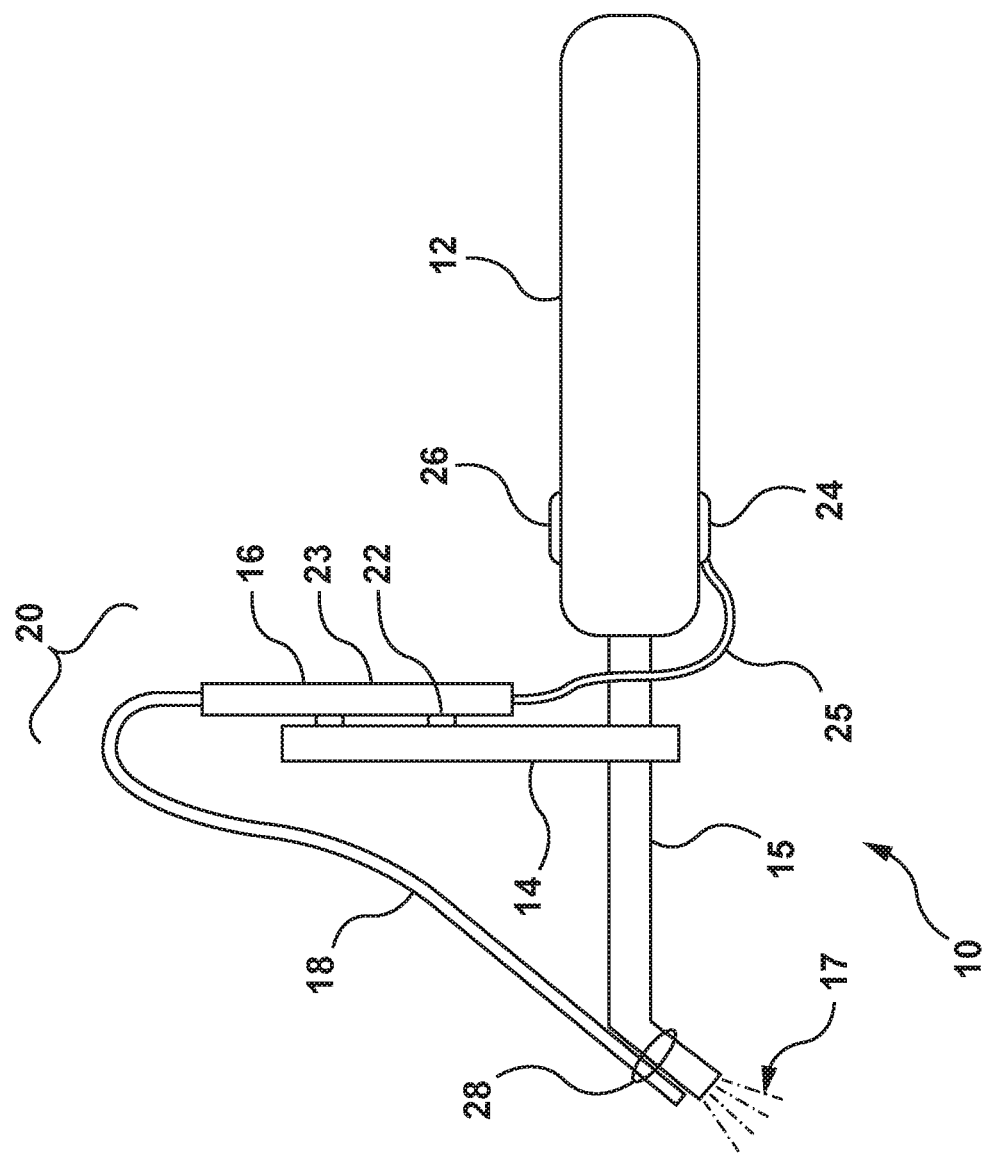
FIG. 1 is a schematic drawing of a dental imaging and/or curing system.

FIG. 1 shows a dental imaging and/or curing system 10. The system 10 has a dental curing light 12, or optionally another source of light or other radiation or electromagnetic waves or waveform energy. The curing light 12 has a plastic plate 14, used to block the light, and a wand 15 where the light 17 is emitted from. An endoscope camera 20 is attached to the curing light 12. Optionally, some or all of the parts of the endoscope camera can be integrated into the curing light. In the example shown, the endoscope camera 20 is made by attaching an endoscope probe 18 to a smartphone 16. One example of an endoscope probe is the USB Phone Endoscope Model DE-1006 from H-Zone Technology Co., Ltd. The smartphone 16, or the body of an endoscope camera preferably having a screen, can be attached to the plate 14 with, for example, two-side tape or hook and loop fastening strips. The endoscope camera 20 can be operated from one or more buttons or touch screens on the smartphone 16 or endoscope camera body. Optionally, a remote button 24 can be attached to the handle of the curing light 12. In the example shown, button 26 is activated, for example by thumb, to turn on light 17 and button 24 is used to take a still picture or start and stop taking a video. In the example shown, button 24 and cable are taken from a disassembled selfie stick. Optionally, a screen of the endoscope camera 20 can be integrated with plastic plate 14. Optionally, endoscope camera 20 could be an intra-oral camera as currently used in dental offices.

The endoscope probe 18 is attached to the wand 15, for example with one or more cable ties 28. The endoscope camera 20 is thereby generally aligned with the end of wand 15 such that the endoscope camera 20 can collect images of an area illuminated by light 17. Optionally, the endoscope probe 18 can be integrated with the wand 15. Optionally, the end of the endoscope camera probe 18 that is placed in the mouth can have an emission filter place over it, as described for the examples below.

In one operating method, the endoscope camera 20 is configured to show a real time image. This image may be recorded as a video while being shown on the screen 23 of the endoscope camera 20, which faces someone holding the curing light 12, or the image may just appear on the screen 23 without being recorded.

The image on screen 23 can be used to help the user point the light 17 at a tooth of interest. When a tooth of interest is in the center of light 17, the tooth of interest will appear brighter than other teeth and be in the center of screen 23. This helps the user aim the light 17. Further, the endoscope camera 20 may include a computer that analyzes images generally as they are received. The computer may be programmed, for example with an app downloaded to smartphone 16, to distinguish between resin and tooth or to allow the user to mark an area having resin. The program determines when the resin is cured. For example, the resin can monitor changing contrast between the resin and tooth while the resin cures and determine when the contrast stops changing.

The light 17 can also be used to illuminate fluorescent nanoparticles, for example as described in the article mentioned above, in lesions in the tooth. The nanoparticles, if any, appear in the image on screen 23 allowing a user to determine if a tooth has an active lesion or not, and to see the size and shape of the lesion. Button 24 can be activated to take a picture or video of the tooth with nanoparticles. Optionally, the image or video can be saved in the endoscope camera 20. Optionally, the image or video can be transferred, at the time of creation or later, to another device such as a general purpose dental office computer or remote server, for example by one or more of USB cable, local wireless such as Wi-Fi or Bluetooth, long distance wireless such as cellular, or by the Internet.

In one example, an app operating in the endoscope camera conveys images, for example all images or only certain images selected by a user, by Wi-Fi or Bluetooth, etc., to an internet router. The internet router conveys the images to a remote, i.e. cloud based, server. The images are stored in the server with one or more related items of information such as date, time, patient identifier, tooth identifier, dental office identifier. The patient is given a code allowing them to retrieve copies of the images, for example by way of an app on their phone, or to transmit a copy to their insurer or authorize their insurer to retrieve them. Alternatively, a dental office person may transmit the images to an insurer or authorize the insurer to retrieve them. An app on the patient's smartphone may also be used to receive reminders, for example of remineralization treatments prescribed by a dentist to treat the lesions shown in the images. A dental office person may also log into the remote server to view the images.

The remote server also operates image analysis software. The image analysis software may operate automatically or with a human operator. The image analysis software analysis photographs or video of teeth to, for example, enhance the image, quantify the area of a part of the tooth with nanoparticles, or outline and/or record the size and/or shape of an area with nanoparticles. The raw, enhanced or modified images can be stored for comparison with similar raw, enhanced or modified images taken at other times to, for example, determine if a carious lesion (as indicated by the nanoparticles) is growing or shrinking in time.

In one example, an operator working at the remote server or in the dental office, uses software operating on any computer with access to images take of the same tooth at two different times. The operator selects two or more distinguishing points on the tooth and marks them in both images. The software computes a difference in size and orientation of the tooth in the images. The software scans the image of the tooth to distinguish between the nanoparticle containing area and the rest of the tooth. The software calculates the relative area of the nanoparticle containing area adjusting for differences in size and orientation of the whole tooth in the photo. In one example, a remote operator sends the dental office a report of change of size in the lesion. In other examples, some or all of these steps are automated.

In another example, data conveyed to the remote server may be anonymized and correlated to various factors such as whether water local to the patient is fluoridized, tooth brushing protocols or remineralization treatments. This data may be analyzed to provide reports or recommendations regarding dental treatment.

Reference to a remote server herein can include multiple computers.

Figure 2:
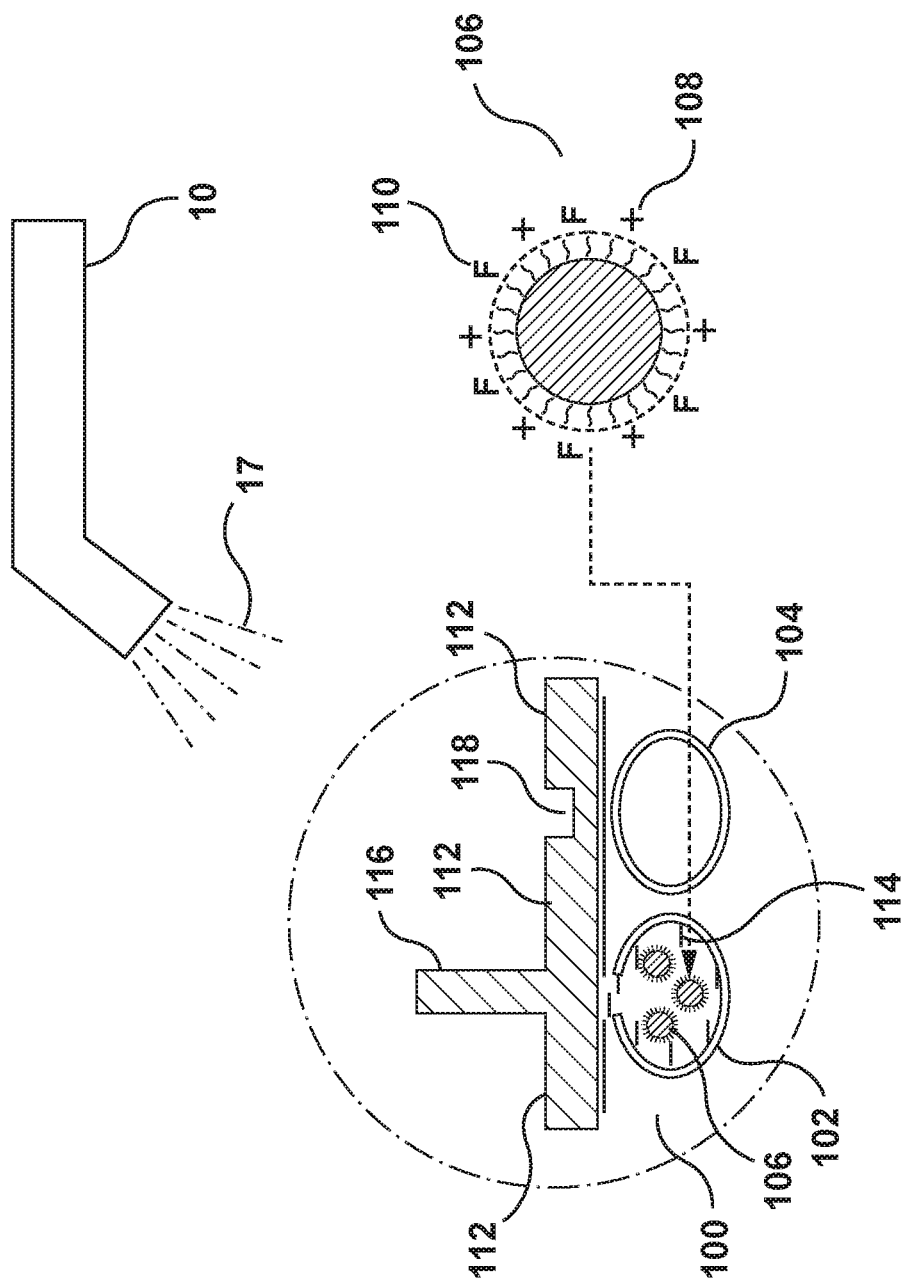
FIG. 2 is a pictorial representation of use of the system of FIG. 1 to detect active carious lesions, and to distinguish them from inactive lesions, which may be re-mineralized lesions.

FIG. 2 shows one possible use of the system 10 or any of other systems described herein. The system shines light 17 (or other waves, radiation, etc.) on a tooth 100. In FIG. 2, numeral 100 shows the enamel of a tooth having an active lesion 102 and an inactive lesion 104. Lesions 102, 104 might alternatively be called caries or cavities or microcavities. Active lesion 102 might be less than 0.5 mm deep or less than 0.2 mm deep, in which case it is at least very difficult to detect by dental explorer and/or X-ray. The inactive lesion 104 may be an active lesion 102 that has become re-mineralized due to basic dental care (i.e. drinking water with fluoride, brushing teeth with fluoride containing toothpaste, routine dental fluoride treatment) or a targeted re-mineralizing treatment. FIG. 2 is schematic and inactive lesion 104 could exist at the same time and on the same tooth as active lesion 102, at the same time as active lesion 102 but in a different tooth, or at a different time as active lesion 102. In one example, inactive lesion 104 is a future state of active lesion 102. In this case, inactive lesion 104 is in the same area of the same tooth 100 as active lesion 102, but inactive lesion 104 exists at a later time.

A fluorescent imaging aid such as nanoparticle 106, optionally a polymer not formed into a nanoparticle, optionally a starch or other polymer or nanoparticle that is biodegradable and/or biocompatible and/or biobased, is contacted with tooth 100 prior to or while shining light 17 on the tooth. For example, nanoparticle 106 can be suspended in a mouth rinse swished around a mouth containing the tooth or applied to the tooth directly, ie. with an applicator, as a suspension, gel or paste. Nanoparticle 106 is preferably functionalized with cationic moieties 108. Nanoparticle 106 is preferably functionalized with fluorescent moieties 110. The active lesion 102 preferentially attracts and/or retains nanoparticles 106. This may be caused or enhanced by one or more an electrostatic effect due to negative charges 114 associated with active lesion 102 and physical entrapment of nanoparticles 106 inside the porous structure of active lesion 102. The nanoparticle 106 may be positively charged, for example it may have a positive zeta potential at either or both of the pH of saliva in the oral cavity (i.e. about 7, or in the range of 6.7 to 7.3), or at a lower pH (i.e. in the range of 5 to 6) typically found in or around active carious lesions.

Shining light 17 on tooth 100 causes the tooth to emit fluorescence, which is recorded in an image, i.e. a photograph, recorded and/or displayed by system 10. Normal enamel of the tooth emits a background fluorescence 112 of a baseline level. The active lesion 102, because it has nanoparticles 106, emits enhanced fluorescence 116, above the baseline level. Inactive lesion 104 has a re-mineralized surface that emits depressed fluorescence 118 below the baseline level.

Analyzing the image produced by system 10 allows an active lesion 102 to be detected by way of its enhanced fluorescence 116. The image can be one or more of stored, analyzed, and transmitted to a computer such as a general purpose computer in a dental office, an off-site server, a dental insurance company accessible computer, or a patient accessible computer. The patient accessible computer may optionally be a smart phone, also programmed with an app to remind the patient of, for example, a schedule of re-mineralizing treatments. In a case where re-mineralizing treatments are applied to tooth 100, active lesion 102 may become an inactive lesion 104.

Comparing images made at different times, particularly before and after one or more re-mineralizing treatments, allows the re-remineralizing progress to be monitored. Increasing fluorescence at a specified area of tooth 100 indicates that the lesion is worsening, and might need a filling. Stable or decreasing fluorescence indicates that remineralization treatment is working or at least that the tooth 100 is stable. A conversion from enhanced fluorescence 116 to depressed fluorescence 118 suggests completed remineralization. Comparison of images can be aided on or more of a) recording images, so that images of tooth 100 taken at different times can be view simultaneously, b) rotating and or scaling an image of tooth 100 to more closely approximate or match the size or orientation of another image of tooth 100, c) adjusting the intensity of an image of tooth 100 to more closely approximate or match the size or orientation of another image of tooth 100, for example by making the background fluorescence 112 in the two images closer to each other, d) quantifying the size (i.e. area) of an area of enhanced fluorescence 116, e) quantifying the intensity of an area of enhanced fluorescence 116, for example relative to background fluorescence 112.

The imaging aid such as nanoparticle 106 preferably contains fluorescein or a fluorescein based compound. Fluorescein has a maximum adsorption of 494 nm or less and maximum emission at 512 nm or more. However the light 17 can optionally comprise any light in about the blue (about 475 nm or 360-480 nm) range, optionally light in the range of 400 nm to 500 nm or in the range of 450 nm to 500 nm or in the range of about 475 nm to about 500 nm. The camera 20 is optionally selective for green (i.e. about 510 nm, or in a range of 500 to 525 nm) light, for example by including a green passing emission filter, or alternatively or additionally the image from camera 20 can be filtered to selectively show green light, i.e. the green channel can be selected in image analysis software.

For example, an image from a general-purpose camera can be manipulated to select a green pixel image. The system can optionally employ a laser light for higher intensity, for example a blue laser, for example a 445 nm or 488 nm or other wavelength diode (diode-pumped solid state or DPSS) laser.

Figure 3:
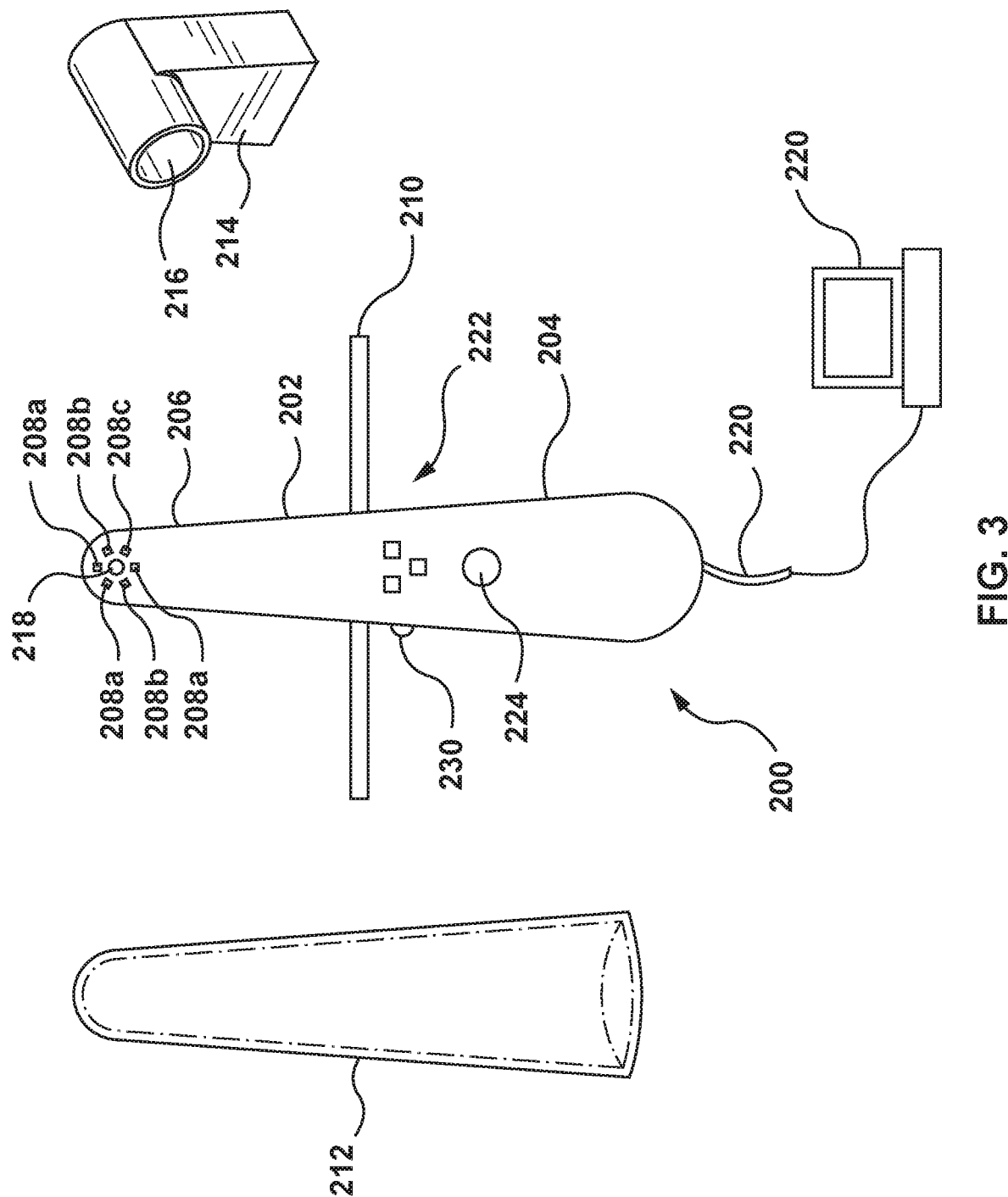
FIG. 3 shows an alternative system.

FIG. 3 shows an alternative intra-oral device 200 for use in the system 10. The device 200 provides a light and a camera like the device shown in FIG. 1 but in a different form. Any elements or steps described herein (for example with FIG. 1 or 2 or elsewhere above or it the claims) can be used with device 200 and any elements or steps described in association with FIG. 3 can be used with the system 10 or anything else disclosed herein.

Device 200 has a body 202 that can be held in a person's hand, typically at first end 204. Optionally a grip can be added to first end 204 or first end 204 can be formed so as to be easily held. Second end 206 of body 202 is narrow, optionally less than 25 mm or less than 20 mm or less than 15 mm wide, and can be inserted into a patient's mouth.

Second end 206 has one or more lights 208. The lights can include one or more blue lights, optionally emitting in a wavelength range of 400-500 nm or 450-500 nm. Optionally, one or more lights, for example lights 208a, can be blue lights while one or more other lights, for example lights 208b, can be white or other color lights. Lights 208a, 208b, can be for example, LEDs. Optionally, one or more lights for example light 208c, can be a blue laser, for example a diode or DPSS laser, optionally emitting in a wavelength range of 400-500 nm or 450-500 nm. One or more of lights 208 can optionally be located anywhere in body 200 but emit at second end 206 through a mirror, tube, fiber optic cable or other light conveying device. Optionally, one or more lights 208 can emit red light. Associated software can be used to interpret images taken under red light to detect the presence or deep enamel or dentin caries.

Optionally, device 200 has an ambient light blocker or screen 210, optionally and integrated ambient light blocker and screen. For hygiene, a sleeve 212, for example a disposable clear plastic sleeve, can be placed over some or all of device 200 before it is placed in a patient's mouth. Optionally, a second ambient light blocker 214 can be placed over the second end 206 to direct light through hole 216 towards a tooth and/or prevent ambient light from reaching a tooth.

Device 200 has one or more cameras 218. Camera 218 captures images of a tooth or teeth illuminated by one or more lights 208. Images from camera 218 can be transmitted by cord 220, or optionally Bluetooth, Wi-Fi or other wireless signal, to computer 220. Images can also be displayed on screen 210 or processed by a computer or other controller, circuit, hardware, software or firmware located in device 200. Various buttons 222 or other devices such as switches or touch capacitive sensors are available to allow a person to operate lights 208 and camera 218. Optionally, camera 218 can be located anywhere in body 200 but receive emitted light through a mirror, tube, fiber optic cable or other light conveying device. Camera 218 may also have a magnifying and/or focusing lens or lenses.

Optionally device 200 has a touch control 224, which comprises a raised, indented or otherwise touch distinct surface with multiple touch sensitive sensors, such as pressure sensitive or capacitive sensors, arranged on the surface. The sensors in the touch control 224 allow a program running in computer 220 or device 200 to determine where a person's finger is on touch control 224 and optionally to sense movements such as swipes across the touch control 224 or rotating a finger around the touch control 224. These touches or motions can be used, in combination with servos, muscle wire, actuators, transducers or other devices, to control one or more lights 208 or cameras 218, optionally to direct them (i.e. angle a light 208 or camera 218 toward a tooth) or to focus or zoom a camera 218.

Device 200 can optionally have an indicator 230 that indicates when a camera 218 is viewing an area of high fluorescence relative to background. Indicator 230 may be, for example, a visible light or a synaptic indicator that creates a pulse or other indication that can be seen or felt by a finger. The user is thereby notified that a tooth of interest is below a camera 218. The user can then take a still picture, record a video, or look up to a screen to determine if more images should be viewed or recorded. Optionally, the device 200 may automatically take a picture or video recording whenever an area of high fluorescence is detected.

Figure 4:
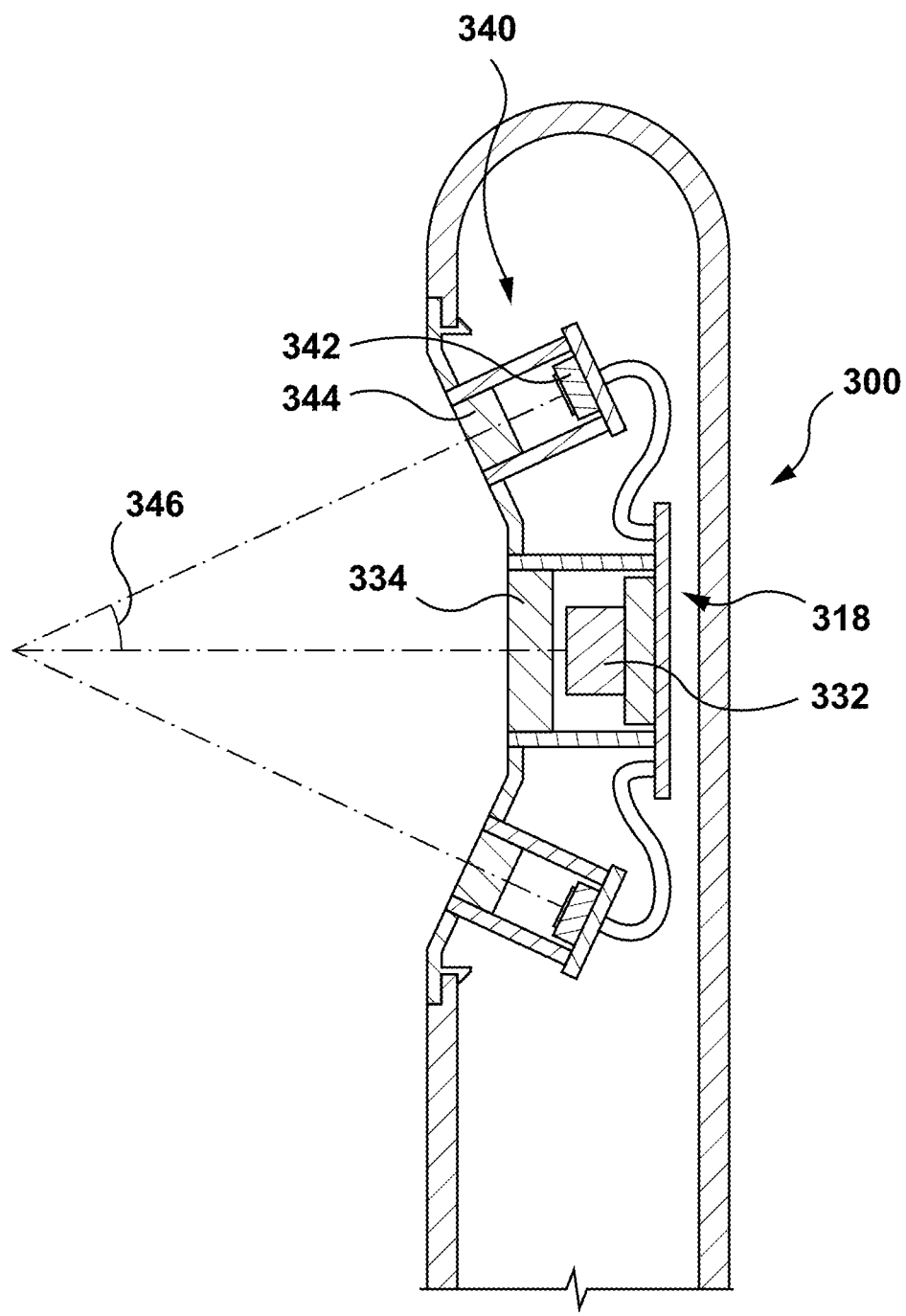
FIG. 4 shown another alternative system.

FIG. 4 shows part of an alternative intra-oral device 300 for use in the system 10. The device 300 provides a light and a camera like the device shown in FIG. 1 but in a different form. Any elements or steps described herein (for example with FIG. 1 or 2 or 3 or elsewhere above or it the claims) can be used with device 300 and any elements or steps described in association with FIG. 4 can be used with the system 10 or anything else disclosed herein. In particular, the part of device 300 shown in FIG. 4 can be used as a replacement for second end 206 in the device 200.

Device 300 has a camera 318 including an image sensor 332 and an emission filter 334 (alternatively called a barrier filter). The image sensor 332 may be a commercially available sensor sold, for example, as a digital camera sensor. Image sensor 332 may include, for example a single channel sensor, such as a charge-coupled device (CCD), or a multiple channel (i.e. red, blue green (RGB)) sensor. The multiple channel sensor may include, for example, an active pixel sensor in complementary metal-oxide-semiconductor (CMOS) or N-type metal-oxide-semiconductor (NMOS) chip. The image sensor 332 can also have one or more magnification and/or focusing lenses, for example one or more lenses as are frequently provided on small digital cameras, for example as in a conventional intra-oral camera such as the LENSIORA™ HD intraoral camera. For example, the image sensor 332 can have an auto-focusing lens. The camera 318 can also have an anti-glare or polarizing lens or coating. While a single channel image sensor 332 is sufficient to produce a useful image, in particular to allow an area of fluorescence to be detected and analyzed, the multiple channel image can also allow for split channel image enhancement techniques either for analysis of the area of fluorescence or to produce a visual display that is more readily understandable to the human eye.

Device 300 also has one or more light sources 340. The light source 340 includes a lamp 342. The light source 340 optionally includes an excitation filter 344. The lamp 342 can be, for example, a light-emitting diode (LED) lamp. The light source can produce white or blue light. In some examples, a blue LED is used. In one alternative, a blue LED with peak emission at 475 nm or less is used, optionally with an excitation filter 344, in order to produce very little light at a wavelength that will be detected by the camera 318, which is selective for light above for example 510 nm, or above 520 nm. In another alternative, a blue LED with peak emission in the range of 480-500 nm (which are available for example in salt water aquarium lighting devices) is used. While a higher frequency blue LED is likely to produce more light that overlaps with the selective range of the camera (compared to a similar blue LED with lower peak emission frequency), a higher frequency blue LED can optionally be used in combination with a short pass or bandpass filter that transmits only 50% or less or 90% or less of peak transmittance of light above a selected wavelength, for example 490 nm or 500 nm or 510 nm. Filters specified by their manufacturers according to 50% of peak transmission tend to be absorption filters with low slope cut-on or cut-off curves while filters specified by their manufacturers according to 90% (or higher) of peak transmittance tend to be dichroic or other steep slope filters that will cut-off sharply outside of their nominal bandwidth. Accordingly, either standard of specification may be suitable. Suitable high frequency blue LEDs may be sold as cyan, turquoise, blue-green or bluish-green lights. In addition to being closer the peak excitation frequency of fluorescein, such high frequency LEDs may produce less excitation of tooth enamel, which has a broad excitation curve peak including lower frequencies. For similar reasons, a bandpass excitation filter may be advantageous over a lowpass excitation filter in reducing tooth enamel fluorescence and useful even with a blue LED of any color.

Optionally, excitation filter 334 may be a bandpass filter with the upper end of its band in the range of 490-510 nm, or 490-500 nm, defined by 50% or 90% of peak transmission. Excitation filter 334 may have a bandwidth (i.e. FWHM) in the range of up to 60 nm, for example 20-60 nm or 30-50 nm, defined by 50% or 90% of peak transmission. Optional excitation filters are Wratten 47 and Wratten 47A sold by Kodak, Tiffen or others or a dichromic filter having a center (CWL) of 450-480 nm, optionally 465-475 nm, and a bandwidth (FWHM) of 20-60 nm, optionally 30-50 nm, wherein the bandwidth is defined by either transmission of 50% of peak or 90% of peak.

The light source 340 can optionally be pointed towards a point in front of the camera 318. For example, a pre-potted cylindrical, optionally flat-topped, or surface mount LED can be placed into a cylindrical recess. In the example shown in FIG. 4, a surface mounted blue LED is located at the bottom of a hole, in particular a tube formed in an insert that includes the camera 318. A cylindrical excitation filter 344 is optionally placed over the LED 342 in the tube. Precise direction of the emitted light is not required. However, to help reduce the amount of reflected light that reaches the sensor, the hole can have an aspect ratio of at least 1 (i.e. a length of 5 mm or more when the diameter is 5 mm), or 1.5 or more, or 2 or more. The LED 342 can be aimed at an angle 346 that is at least 20 degrees apart from an aiming line of the sensor 332. Alternatively, a commercially available lensed LED 342 (i.e. an LED pre-potted in a resin block) with a viewing angle of 45 degrees or less may be used. There may be one light source or, as shown for example in FIG. 4, 2 light sources can be used. Optionally, there may be 3 or more light sources.

The camera 318 optionally includes a longpass or bandpass barrier filter 334. In some previous work as described in the background section, photographs were taken through orange filters of the type used in goggles to protect the eyes of dental professionals from blue curing lamps. Useful images of extracted teeth were obtained, particularly in combination with green pixel only image modification, from a conventional digital camera. These orange filters are longpass filters, but with somewhat high cut-offs as is appropriate for eye protection. For example, UVEX™ SCT-Orange™ goggles have a cut-on frequency of about 550 nm. Transmission through these goggles at the fluorescein emission peak of 521 nm is very low (i.e. less than 5% of peak) and transmission even at 540 nm is still less than 25% of peak.

Images can be improved by using a longpass filter with a lower cut-on frequency, for example a cut-on frequency of in the range of 510-530 nm. For example, a Wratten 12 yellow filter or Wratten 15 orange filter, produced by or under license from Kodak or by others, may be used.

Further improved imaging can be achieved by using a bandpass filter with 50% transmission or more or 90% transmission or more in a pass band starting in the range of 510-530 nm, for example at 515 nm or more or 520 nm or more. The center frequency (CWL) may be in the range of 530-550 nm. The use of a bandpass filter is preferred over a longpass filter because tooth enamel has a broad emission spectra with material emission above 560 nm. The barrier filter 334 may be a high quality filter, for example a dichromic filter, with sharp cut-offs.

In the examples above, the teeth are preferably cleaned before applying the nanoparticles to the teeth to remove excess plaque and/or calculus. This removes barriers to the nanoparticles entering active lesions and reduces interfering fluorescence from the plaque or calculus itself. Similarly, the nanoparticles may enter a crack in a tooth and allow for taking an image of the crack. Alternatively, the plaque and/or calculus can be left in place and the device 10, 200, 300 can be used to image the plaque or calculus. The nanoparticles may be applied to adhere to the plaque and/or calculus. Alternatively, an aqueous fluorescein solution may be used instead of the nanoparticles to increase the fluorescence of plaque and/or calculus. The fluorescein in such a solution does not need to be positively charged.

In the discussion above, the word "nanoparticles" refers to particles having a Z-average size (alternatively called the Z-average mean or the harmonic intensity averaged particle diameter, optionally as defined in ISO 13321 or ISO 22412 standards), as determined for example by dynamic light scattering, of 1000 nm or less, 700 nm or less, or 500 nm or less. In some contexts or countries, or according to some definitions, such particles may be called microparticles rather than nanoparticles, particularly if they have a size greater than 100 nm, which is optional. In other alternatives, the nanoparticles may have a Z-average size of 20 nm or more.

The word "fluorescein" is used colloquially and refers to fluorescein related compounds which include fluorescein; fluorescein derivatives (for example fluorescein amine, fluorescein isothiocyanate, 5-carboxy fluorescein, carboxyfluorescein succinimidyl esters, fluorescein dichlorotriazine (DTAF), 6-carboxy-4',5'-dischloro-2',7'-dimethoxyfluorescein (JOE)); and, isomers of fluorescein and fluorescein derivatives. Although the examples described herein are based on fluorescein, other fluorophores may be used, for example rhodamine or others, with adjustments to the light source and/or sensor if required. For example, rhodamine B can be excited by a green LED and photographed with a sensor having an emission bandpass filter with a CWL in the range of 560-580 nm.

The examples describe handheld intra-oral devices. However, in other alternatives various components of the device, for example lamps, filters and sensors, can be placed in or near a mouth as parts of other types of intra-oral devices or oral imaging systems. Multiple sensors may also be used. For example, the device may be a partial or whole mouth imaging device or scanner operated from either a stationary or moving position in or near the mouth. Although the intra-oral device described in the examples is intended to produce an image of only one or a few teeth at a time, in other alternatives a device may produce an image of many teeth, either as a single image or as a composite produced after moving the device past multiple teeth.

The article—*Carious Lesions: Nanoparticle-Based Targeting and Detection of Microcavities*—Advanced Healthcare Materials Vol. 6 No. 1 Jan. 11, 2017 (Adv. Healthcare Mater. January 2017) is incorporated herein by reference. This article describes cationic starch-based fluorescent nanoparticles. The nanoparticles are attracted to carious lesions and glow under a dental curing light. International Publication Number WO 2017/070578 A1, Detection and Treatment of Caries and Microcavities with Nanoparticles, published on Apr. 27, 2017 is also incorporated by reference.

We claim:

1. An intra-oral imaging device comprising,
   a body having an end suitable to be placed in the mouth of a person;
   a blue LED in the body of the device;
   an image sensor in the body of the device; and
   a barrier filter with a cut-on frequency in the range of 510-530 nm over the image sensor;
   a white light;
   and, a red light,
   wherein the blue LED, the white light, the red light and the image sensor are located on the end of the body that is suitable to be placed in the mouth of a person.

2. The device of claim 1 wherein the blue LED has a peak emission in the range of 480-500 nm.

3. The device of claim 1 further comprising a bandpass excitation filter over the blue LED.

4. The device of claim 3 wherein an upper end of the pass band of the bandpass excitation filter is in the range of 490-510 nm and the bandpass excitation filter has a bandwidth in the range of 20-60 nm.

5. The device of claim 1 wherein the barrier filter is a bandpass filter.

6. The device of claim 5 wherein the bandpass barrier filter has a pass band starting in the range of 510-530 nm and a center frequency in the range of 530-550 nm.

7. The device of claim 1 further comprising an image storage device and an image viewing screen and a computer, wherein the computer is programmed to compare the size of fluorescent regions in images of a tooth taken at two different times.

8. An intra-oral imaging device comprising,
   a body having an end suitable to be placed in the mouth of a person;
   a blue LED in the body of the device;
   an image sensor in the body of the device; and
   a barrier filter with a cut-on frequency in the range of 510-530 nm over the image sensor,
   wherein the blue LED has an aiming direction that intersects with an aiming direction of the image sensor and wherein there is at least 20 degrees between the aiming direction of the blue LED and the aiming direction of the image sensor, and further comprising a second blue LED wherein the second blue LED has an aiming direction that intersects with the aiming direction of the image sensor from an opposite side of an aiming direction of the image sensor.

9. The device of claim 8 wherein the image sensor comprises a multiple channel digital camera sensor located between the blue LED and the second blue LED.

* * * * *